Nov. 15, 1927.
B. A. KNUDSON
1,649,779
ROTARY VALVE FOR COMBUSTION ENGINES
Filed Nov. 1, 1926
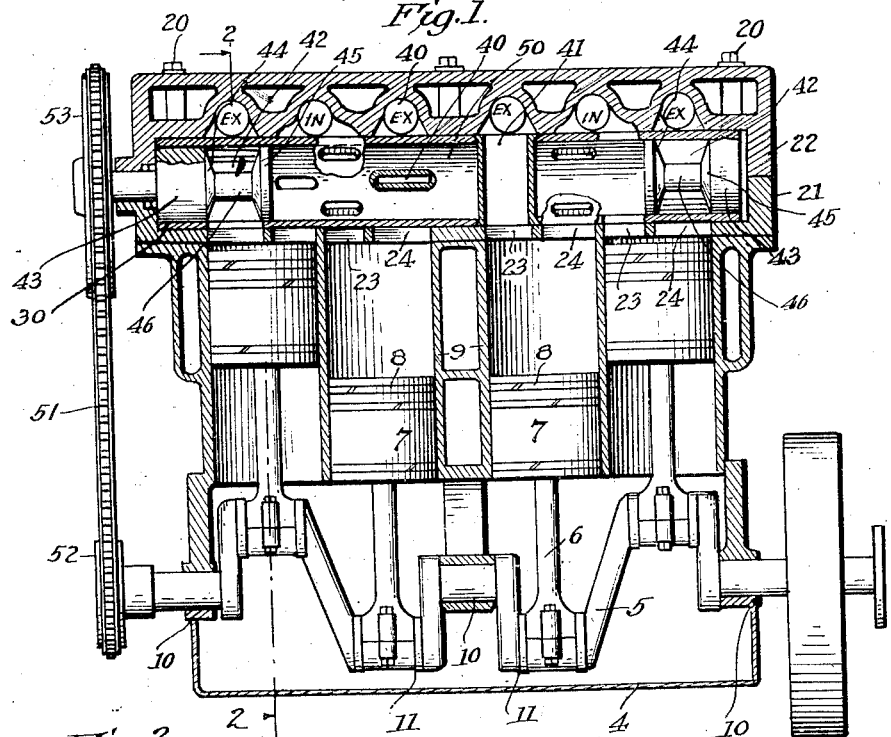
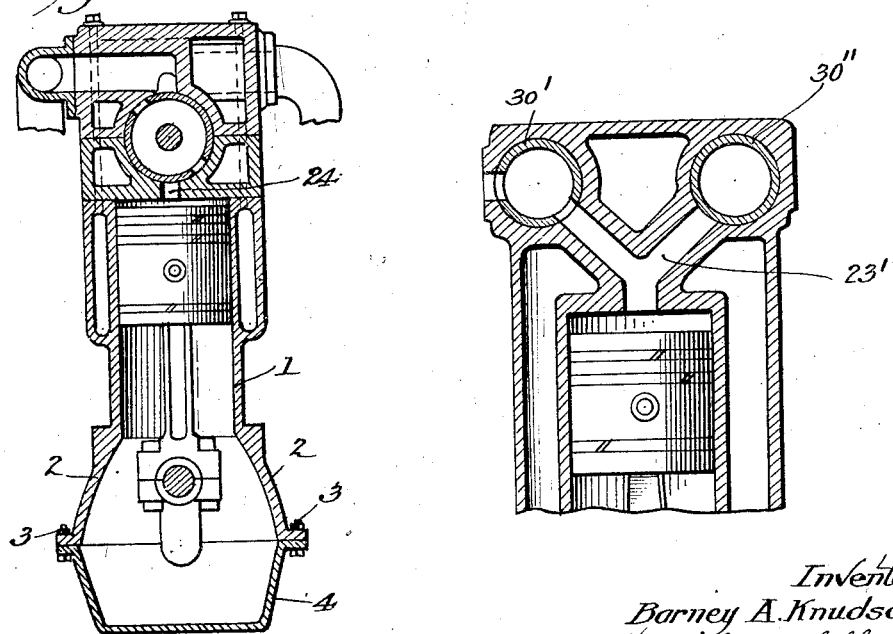
Inventor:
Barney A. Knudson,
by Hazard and Miller
Attorneys Patented Nov. 15, 1927.

1,649,779

UNITED STATES PATENT OFFICE.

BARNEY A. KNUDSON, OF SANTA ANA, CALIFORNIA.

ROTARY VALVE FOR COMBUSTION ENGINES.

Application filed November 1, 1926. Serial No. 145,525.

This invention relates to rotary sleeve valves for combustion engines and more particularly to that class of engines which is especially adapted for use in the automobile industry.

An object of my invention is to provide a rotary sleeve valve-in head which is simple and durable in construction and which is adapted to supplant the widely used type of poppet valve.

Another object of my invention is to provide a rotary sleeve valve which is constructed and assembled in one piece and which will automatically perform the function of a number of poppet valves.

With the foregoing and other objects in view which will be made manifest in the following detailed description and specifically pointed out in the appended claims, reference is had to the accompanying drawings for an illustrative embodiment of the invention, wherein:

Figure 1 is a side view partly in section taken through an internal combustion engine employing the principles of my rotary sleeve valve-in head motor, Fig. 2 is an end sectional view taken along the lines 2—2 of Fig. 1, and Fig. 3 is an end sectional view of a modified form of my invention, wherein I have employed the use of two rotary sleeve valves in the cylinder head.

Referring to the accompanying drawings, wherein similar reference characters designate similar parts throughout, the engine block is illustrated at 1 and has a depending apron 2 at its lower extremity. Secured to this apron by means of suitable bolts 3 is a crank case 4. This crank case is adapted to receive a supply of oil to lubricate the main and connecting rod bearings which operate within the crank case. The conventional type of crank shaft is shown at 5, and this together with the connecting rods 6, the pistons 7, the piston rings 8, cylinder walls 9, main bearings 10 and connecting bearings 11 cooperate to form the conventional type of rotary four cycle internal combustion engine. The parts thus far shown are to be taken as merely illustrative in connection with my invention and no claim as to novelty or ingenuity in constructing these parts is made.

While it is evident that I contemplate the use of my invention in engines of greater or less horse power or with engines having a greater or less number of cylinders, I prefer in this instance to illustrate my invention in connection with the ordinary four cycle four cylinder combustion engine. I will now describe in detail the parts which are illustrated in the drawings and which in assembled relation constitute my invention.

Suitably secured to the engine block 1 by means of bolts 20 are a pillow member 21 and a cap member 22. These members in horizontal cross section are of the same configuration as the engine block and rest thereupon in superimposed relation and may be separated from each other and from the engine block by a suitable gasket, not shown, to prevent the escape of exploded gases or water. The pillow member 21 has an elongated semi-circular recess extending throughout its entire length, and formed centrally in the bottom of the recess are a series of exhaust and intake ports 23 and 24 respectively. In this instance since I have employed the use of four cylinders, there will be four intake ports and four exhaust ports. Adapted to fit snugly within this semi-circular recess in the pillow member is an elongated tubular cylindrical sleeve valve member 30, and this sleeve member has, situated at various points on its circumference, a similar series of intake and exhaust ports adapted to register with the ports which are located centrally of the recess in the pillow member 21. The exhaust ports in both instances are shown as elongated slots which are slightly longer than the intake ports. The exhaust ports on the rotary sleeve are shown at 25 while the intake ports are shown at 26, and in this instance there are four in number of each. Two of the exhaust ports in the cylindrical sleeve member occupy a position at the outer end of the same, while the remaining two exhaust ports are located at intermediate positions. These two centrally located exhaust ports are formed by diametrically opposed elongated slots 40 and 41 which are connected by an elongated tubular member which fits snugly within the slots and which forms diametrical channels extending through the cylindrical valve member. The exhaust ports located at the outer end of the cylindrical valve member are similarly formed by elongated diametrically opposed slots, but these slots communicate with one another through chambers 42 instead of an elongated tubular sleeve member such as is shown at 41. These chambers are formed by the insertion of the members 43 having baffles 44 and 45 connected together at 46.

The insertion of the two members 43 at each end of the cylindrical valve member serves to form a centrally located chamber 50 and all of the intake ports 26 communicate directly with this chamber. A series of exhaust manifolds 44 and intake manifolds 45 are located in the cap member and each is adapted to communicate with its respective exhaust or intake port in the cylindrical sleeve member. While it is possible that I might employ the use of the elongated tubular sleeve members in connecting diametrically opposed slots, forming the intake ports in the cylindrical sleeve member and also forming the two outer exhaust ports, I have deemed this construction unnecessary and have preferred to construct the diametrically opposed slots in one instance so as to communicate directly with the interior of the chamber 50 and in the other instance communicate directly with the interior of the chamber 42. As the chamber 50 is sealed, except when one of the intake ports 26 forms a connection between the intake manifold and the combustion chamber, there is no necessity for forming these elongated tubular members in the slots.

No detailed description of the exhaust arrangement of ports on the cylindrical valve member will be given in this specification, as it is believed sufficient to say that the same are suitably located at points on the circumference of the cylindrical member so as to give the proper timing effect and to introduce gas into each cylinder as the same is required and to permit the escape of exploded gases at the opportune moment. The cylindrical valve member 30 is adapted to be rotated directly from the crank shaft 5 by means of a chain or gear 51 which forms an operative connection between the two pulley wheels 52 and 53 as shown in Fig. 1. These wheels are so constructed as to have a diametrical ratio of one to four so that upon every complete revolution of the crank shaft 5, a quarter of a revolution of the cylindrical valve member 50 occurs.

In Fig. 3 I have illustrated a modified form of my invention. In this figure I have shown two cylindrical valve members 30' and 30'', the former of which controls the exhaust valves and the latter controls the intake valves. The Y port 23' communicates directly from the combustion chamber to each of these valves. This, however, is an alternative construction and I have described my invention fully in connection with the preferred form shown in Fig. 1.

I have thus illustrated my invention in connection with a four cycle four cylinder internal combustion engine. However, I do not desire to limit myself to the exact arrangement of parts set forth in this detailed description. For example, I contemplate use of my improved valve structure in connection with six and eight cylinder engines and I contemplate modifying my cylindrical valve structure and thereby accommodate it to such use.

It will be understood that various changes in the detail of construction may be made without departing from the spirit and scope of the invention as defined by the appended claims.

I claim:

1. A rotary valve for internal combustion engines comprising in combination a pillow member and a cap member, a hollow, cylindrical valve member adapted to rotate in said cap and pillow members, said cylindrical member having diametrically opposed, elongated slots therein, certain of said slots being connected by a flat, tubular member, thereby forming a closed passage-way through the valve member, a spool-like member having circular flanges on the ends thereof in said valve member, said end flanges fitting tightly against the interior of said valve member and shutting off a pair of said opposed slots from communication with the remainder of the interior of the valve member, others of said slots communicating with the interior of the valve member as and for the purpose specified.

2. A rotary valve for internal combustion engines comprising in combination a pillow member and a cap member, a hollow, cylindrical valve member adapted to rotate in said cap and pillow members, said cylindrical member having diametrically opposed, elongated slots therein, certain of said opposed slots being connected by a flat, tubular member, thereby forming a closed passage-way therethrough, spool-like members having circular end flanges fitting within said tubular member and dividing the same into compartments, said spool members each defining in conjunction with said valve member, a compartment between the flanges of the same, and each confining a pair of opposed slots to communication solely with said compartment, others of said opposed slots communicating with the interior of said tubular valve member as and for the purpose specified.

3. The combination with an internal combustion engine having a block, of a pillow member and a cap member, both removably attached to said block, a hollow, cylindrical valve member adapted to rotate in said cap and pillow members, said cylindrical member having diametrically opposed, elongated slots therein, certain of said opposed slots being connected by a flat, tubular member, thereby forming a closed passageway therethrough, others of said slots communicating with the general interior of the valve member, spool-like members insertable in said valve member, having end flanges fitting tightly against the interior of said valve member, each spool member shutting off a pair of opposed slots from the general interior of the valve member as and for the purpose specified.

In testimony whereof I have signed my name to this specification.

BARNEY A. KNUDSON.